United States Patent
Werquin et al.

(10) Patent No.: US 8,525,113 B2
(45) Date of Patent: Sep. 3, 2013

(54) PORTABLE RADIOMETRIC IMAGING DEVICE AND A CORRESPONDING IMAGING METHOD

(75) Inventors: Matthieu Werquin, Ronchin (FR); Nicolas Thouvenin, Faches Thumesnil (FR); Simon Vandenbrouck, Ottobrunn Muenchen (DE); Christophe Gaquiere, Villeneuve d'Ascq (FR); Frederic Bue-Erkmen, Lille (FR); Nicolas Vellas, Halluin (FR)

(73) Assignee: Microwave Characterization Center, Villeneuve d'Ascq (FR)

( * ) Notice: Subject to any disclaimer, the term of this patent is extended or adjusted under 35 U.S.C. 154(b) by 0 days.

(21) Appl. No.: 13/318,051

(22) PCT Filed: Apr. 30, 2010

(86) PCT No.: PCT/FR2010/050831
§ 371 (c)(1),
(2), (4) Date: Oct. 28, 2011

(87) PCT Pub. No.: WO2010/125322
PCT Pub. Date: Nov. 4, 2010

(65) Prior Publication Data
US 2012/0038507 A1 Feb. 16, 2012

(30) Foreign Application Priority Data

Apr. 30, 2009 (FR) ...................... 09 52890

(51) Int. Cl.
*G01J 5/00* (2006.01)
(52) U.S. Cl.
USPC ...................................... 250/338.1
(58) Field of Classification Search
USPC ............ 250/336.1–336.2, 338.1–338.5, 340, 250/341.1–341.8
See application file for complete search history.

(56) References Cited

U.S. PATENT DOCUMENTS 4,719,350 A * 1/1988 Alm ............................. 250/330
7,308,154 B1 * 12/2007 Ferrante et al. ............... 382/275
(Continued)

FOREIGN PATENT DOCUMENTS

EP 1 923 679 A1 5/2008
WO 2007/054685 A1 5/2007

OTHER PUBLICATIONS

International Search Report mailed Sep. 10, 2010 of PCT/FR2010/050831.

(Continued)

*Primary Examiner* — Kiho Kim
(74) *Attorney, Agent, or Firm* — Kenyon & Kenyon LLP

(57) ABSTRACT

The invention relates to a portable radiometric imaging device and to a corresponding method, finding a particular application in detecting articles carried by passengers or contained in baggage, for example in airports and train stations. The device includes a plurality of receiver antennas for picking up electromagnetic radiation from a plurality of parts of a body or an article and converting them into a plurality of signals representative of said radiation, a plurality of receiver modules associated with the antennas for receiving the signals representative of the radiation and converting them into a plurality of electrical signals, and a digital processor unit for responding to the electrical signals to create one or more digital signals representative of the electromagnetic radiation for display on a display as an image of the body or article. A correlator module is provided for correlating the electrical signals in order to form a signal representative of the electromagnetic radiation from the intersection of the two parts of the body or article.

11 Claims, 11 Drawing Sheets

(56) References Cited

U.S. PATENT DOCUMENTS

2006/0049980 A1 3/2006 Archer et al.
2006/0061653 A1* 3/2006 Hampapur et al. ........... 348/143

OTHER PUBLICATIONS

Translation of IPRP of PCT/FR2010/050831 dated Nov. 3, 2011.

* cited by examiner

PORTABLE RADIOMETRIC IMAGING DEVICE AND A CORRESPONDING IMAGING METHOD

The present invention relates to a portable radiometric imaging device and a corresponding imaging method. It finds a particular application to detecting articles carried by passengers or contained in baggage in places such as airports or train stations.

Security considerations are important in all countries worldwide, for example given the risk of bomb attacks.

Various detector systems have been developed or are being developed, such as airport security gates using radiometry to detect metal or other articles carried by passengers, infrared imaging systems, and bacteriological (chromatographic, spectrometric) detector systems.

All those systems offer different performances depending on their technology, but are also very costly and bulky.

In fact, no portable baggage verification device exists that makes it possible, for example, to map the contents of baggage left unattended in public places such as train or bus stations, motorway service areas, airport terminals, underground railways, etc.

If suspect baggage is discovered in a busy public place, specialist security (bomb disposal) services are called out. The response time may be long depending on the availability of these services and on the complexity of their response (central or suburban location). These disturbances to traffic flow are now a factor in user dissatisfaction and represent a major financial loss.

The presence of such baggage in stations, for example, results in total paralysis of rail traffic for several minutes or even several hours and consequently leads to a complete upheaval of rail traffic on all lines.

To reduce or even eliminate these disturbances it is therefore necessary to be able to use a portable imaging device to produce on site an image of the contents of suspect baggage or packages without having to touch them.

The present invention relates to so-called radiometric devices.

Such devices employ far-field radiometric measurements.

Radiometry is a fairly broad term designating measurement of the intensity of ionizing or non-ionizing electromagnetic radiation.

Ionizing radiation (for example X and $\gamma$ rays, $\alpha$ and $\beta$ particles) has sufficient energy to detach electrons from atoms or molecules when it strikes or passes through a substance.

In contrast, non-ionizing radiation (for example radiowaves, microwaves, visible light, etc.) is of low energy.

Radiometric devices are based on determining a physical magnitude called a "temperature". The physical principle employed for this type of measurement is measuring electromagnetic radiation of thermal origin emitted by any body at a temperature different from zero kelvins (0 K). The main benefit of such measurements is that they are non-invasive to much greater depths than infrared measurements.

Thus any body having a physical temperature that is not equal to 0 K emits noise power in directions in space imposed by its topology.

The object of the invention is thus to propose a radiometric device that enables qualified security personnel at stations, airports, etc. to view the content of baggage without taking risks and to determine for themselves how dangerous they are.

This tool makes a rapid response possible, while also being safe. It could equally be used by bomb disposal operatives in their day to day call-outs to identify on site the type of explosive, the mechanism for detonating a bomb, etc. in a manner considerably limiting the risk to them.

One of the most serious problems linked to the development of such a tool lies in the conflict between the portability of the device and the spatial resolution of the image.

Thus producing an image of appropriate resolution encounters difficulties concerning in particular the number and type of antennas, radiometric sensitivity, the time needed to produce an image, investigation depth, the method of calibrating each channel, etc.

Moreover, the required device must be capable of detecting articles of very small size by measuring their emitted noise power.

Also, the device must have the lowest possible sensitivity in order to detect the lowest possible temperature variations.

The object of the invention is thus to provide a solution to some or all of these problems by proposing a sensitive portable radiometric imaging device offering high spatial resolution.

Thus a first aspect of the invention relates to a portable radiometric imaging device.

The device includes at least two receiver antennas adapted to capture electromagnetic radiation from first and second parts of a body or an article and to convert it into first and second signals representative of said radiation.

The device also includes receiver modules associated with the two antennas and adapted to receive the first and second signals representative of the radiation and to convert them into first and second electrical signals.

The device further includes a digital processor unit adapted to create from the first and second electrical signals one or more digital signals representative of the electromagnetic radiation to be displayed on a display as an image of the body or article.

The device characteristically further includes a correlator module adapted to correlate the first and second electrical signals in order to form at least one signal representative of the electromagnetic radiation from the intersection of the first and second parts of the body or article.

Accordingly, because of the correlator module, the device of the invention is of small overall size, and is therefore more portable, and it produces an image of high spatial resolution at the same time as reducing the noise temperature of the system.

The major benefit of the invention therefore relates to the use of a correlator module associated via two receiver modules with two antennas.

This correlator module produces the correlation product of signals received from the two antennas via the associated receiver circuits, together with the inherent noise of the receiver circuits.

Moreover, the antennas, which are associated with a common focusing optical element, are disposed so that they receive signals from a common area of the scene. This nominal area corresponds for example to half the total area seen by an antenna. Because of this, only signals coming from this area common to the two antennas are correlated.

Consequently, the correlation product makes it possible to limit the observed area of the scene to the common area seen by both antennas. Accordingly, by means of this technique, spatial resolution is improved by a factor of two without mechanical or digital spatial scanning.

Moreover, given that there is little or no correlation between the inherent noise of the various receiver channels, the noise temperature of the system after correlation tends toward zero. Consequently, the correlation process eliminates the effect of the noise temperature of the system, thus offering several possibilities compared to the usual radiometer architecture, such as:

improved radiometric sensitivity for the same integration time; or reduced integration time for the same radiometric sensitivity.

Variants of the invention are described below that may be considered alone or in any combination.

One or both of the receiver modules may include a transition module. This transition module preferably includes a noise-injector diode connected to a coupler. This coupler is preferably connected to a low-noise amplifier.

One or both of the receiver modules may include a frequency reducer module. This frequency reducer module preferably includes a millimeter-band mixer and a low-frequency low-noise amplifier.

The receiver modules and the digital processor unit may be on the same semiconductor chip.

The device may include a module for converting the first and second electrical signals into respective first and second digital signals. The correlator module is then a digital correlator module for digital signals, preferably integrated into the processor unit.

In order, to effect spatial scanning without affecting radiometric sensitivity and without increasing the complexity of the receiver, it is preferable to produce the correlation product digitally.

Operating on the time-shift of the signal coming from one antenna relative to that coming from one of the adjacent antennas and producing the correlation product for this time-shift modifies the overlap area, thereby achieving spatial scanning.

The digital correlation product has at least three benefits: it enables spatial scanning, it eliminates the effect of the inherent noise of the receivers, and it does not unduly affect the time dedicated to radiometric measurements.

The operation of the radiometric architecture for producing the correlation product digitally is explained below.

Each antenna is associated with its receiver module that converts analog vector signals received by the antenna into analog vector signals at lower frequency.

These signals are initially stored in random-access memory after being digitized in order to be able to process them mathematically thereafter.

The sensitivity of the digital radiometer depends on its inherent noise temperature and the number of samples:

$\delta T = T_{sys}/\sqrt{N}.$

The sensitivity is improved by increasing the number of samples. In other words, it is necessary to produce a measurement over a given time in order to increase N and consequently sensitivity.

For example, if an analog-digital converter (ADC) operating at 1 giga sample per second (GS/s) is used and the measurement takes 1/10 second (s), then N is equal to 100 million samples.

For each receiver module, a vector average of these 100 million samples may be produced in the frequency domain and the result (which is a vector result combining the concepts of modulus and phase) is stored in memory after being returned to the time domain.

If the portable camera has a matrix of 7×7 antennas, for example, then 49 receiver modules acquire signals simultaneously, i.e. there is a total acquisition, averaging, and storage time for the whole of the matrix of 1/10 second.

It must be noted that if speed is required rather than sensitivity, then the acquisition time may be reduced and vice-versa.

Once acquisition has been effected, the random-access memory of the device contains a digital vector signal for each receiver module, i.e. 49 vector signals in total.

At this precise moment, the image has not yet been reconstituted. To effect spatial scanning of the scene with the article of digitizing the image, the digital vector signals coming from two adjacent antennas that have observed a common area of the scene are correlated mathematically.

The correlation is effected for different time constants τ (the time-shift between the two signals) in order to obtain for each value of τ a digital vector signal proportional to the noise power emitted by part of the area of the scene.

Thus no additional measurements are effected. It is merely a question of applying mathematical processing to the results of previous measurements stored in memory.

The digitizing of the area of the scene depends on the values of the delay τ for which the correlation products were produced.

Consider a concrete example: if the camera is located 1 meter (m) from the scene, if the antennas are spaced apart from one another by 2 millimeters (mm), and if the spatial resolution required in the plane of the scene is 5 mm, then by simple mathematical calculation (propagation speed+geometrical calculation), the delay between the two digital signals to be applied is 42 femtoseconds (fs).

This very low value is difficult to achieve. In fact, the minimum delay that it is possible to apply corresponds to the time-shift between two samples as determined by the sampling rate of the ADCs. If that rate is 1 GS/s, the time-shift between two samples is 1 nanoseconds (ns).

It must be borne in mind that the receiver module includes a millimeter-band mixer enabling frequency reduction. If the frequency of the (mono-harmonic) signal emitted by the scene and received by the antenna is of the order of 100 gigahertz (GHz) and the millimeter-band mixer enables the frequency of the measured signal to be reduced to 1 megahertz (MHz), the ratio between the frequencies of the signals before and after frequency reduction reaches 100,000. This ratio corresponds to time compression or expansion depending on the direction of the frequency conversion.

In other words, if a digital time-shift of 1 ns is applied to the frequency-reduced signal, it corresponds to a time-shift of 10 fs in the signal before frequency reduction. Consequently, frequency reduction makes it possible to produce adequate time-shifts. The greater the frequency reduction ratio, the lower the time-shift value that can be achieved.

As explained below, this is true for a mono-harmonic signal. In contrast, to benefit from the impact of frequency reduction with multi-harmonic noise signals it is necessary to process the signals mathematically before producing the correlation product.

The introduction of a frequency reducer module makes it possible to use ADCs with a sampling rate that is not too high (<1 GS/s). In contrast, if ADCs with a sampling rate greater than 200 GS/s are available, then there is no need for frequency reduction.

In order to obtain a correlation product of signals from all the antennas seeing a common area of the scene, it is necessary for the mixers of the receiver modules to employ synchronous local oscillator signals, i.e. signals coming from the same source. To summarize, 1/10 second is assigned to measurement and the image is digitized a posteriori.

Consequently, this solution is particularly well suited to the production of a high-performance portable radiometric imaging device.

Alternatively, the correlator module may be an analog correlator module including at least one first sub-module for generating at its output, from the phase-shifted first and second electrical signals, two signals respectively corresponding to the sum and to the difference of the two input digital signals.

The first sub-module is preferably a hybrid coupler with two inputs.

The analog correlator module optionally further includes at least two square-law detector sub-modules receiving at their inputs respective output signals from the first sub-module.

The analog correlator module further optionally includes a differential amplifier sub-module adapted to receive at its two inputs respective output signals from each square-law detector sub-module.

The device preferably includes a module for converting the output signal or signals from the analog correlator module into at least one digital signal with a view to the processor unit processing that digital signal.

The receiver modules and the correlator module may be on the same semiconductor chip.

The radiometer architecture that enables the analog correlation product to be produced operates as explained below.

Each antenna is associated with its receiver module, which converts the low-amplitude analog vector signals received by the antenna into analog vector signals of greater amplitude.

After they have been amplified by the receiver module, the analog vector signals coming from two adjacent antennas that have observed a portion of the area of the scene are injected into the input of the analog correlator (consisting of a 180° hybrid coupler, two square-law detectors, and a low-frequency differential amplifier).

The analog signal obtained at the output of the analog correlator (i.e. the output of the low-frequency differential amplifier) corresponds to the analog correlation product of the signals coming from the two adjacent antennas. This is a DC signal of amplitude that is proportional to the noise power emitted by the common area seen by both antennas.

Since there is virtually no correlation between the inherent noise of the two receiver modules associated with the two adjacent antennas, the impact of noise on the correlation product is negligible, thus making it possible to have a low noise temperature $T_{sys}$.

Similarly, there is no correlation of the noise power emitted by the scene area not, observed simultaneously by the two antennas. Because of this, this noise power does not appear in the correlation product. The sensitivity of the analog radiometer depends on its inherent noise temperature ($T_{sys}$), its bandwidth (B), and the signal integration time ($\tau$), as follows:

$$\delta T = T_{sys}/\sqrt{B\tau}.$$

Knowing that $T_{sys}$ is weakly linked to the correlation product, the improvement in sensitivity is achieved mainly by increasing the bandwidth or the integration time.

In contrast to a digital correlation radiometer architecture, the signal at the output of the analog correlator is a DC signal (containing only amplitude information). Consequently, this architecture does not enable a posteriori digital spatial scanning.

In order to digitize the area of the scene covered by the imaging device, it is necessary to effect spatial scanning mechanically. In other words, it is necessary to use a precision mechanical device to steer the radiation pattern of the optics-and-antenna system in two directions x and y in space in order to scan the area of the scene. It is necessary to produce a measurement for each position.

Because of this, as many measurements are produced as there are pixels in the scene, in contrast to a digital correlation architecture, in which only one measurement is effected.

Consequently, it is crucial to limit the integration time to as low a value as possible. Because of this, and so that the low integration time does not affect the radiometric sensitivity, it is preferable to maximize the bandwidth of the system.

This solution is equally suitable for producing a high-performance portable radiometric imaging device.

A second aspect of the invention relates to a radiometric imaging method.

The method includes a step of at least first and second receiver modules receiving and converting into electrical signals first and second signals respectively representative of radiation from first and second parts of a body or an article captured by first and second antennas.

The method also includes a step of a digital processor unit creating from the first and second electrical signals at least one digital signal representative of the electromagnetic radiation to be displayed on a display as an image of said body or article.

The method characteristically further includes a step of correlating the first and second electrical signals in order to form at least one signal representative of the electromagnetic radiation from the intersection of the first and second parts of the body or article.

In a first variant the first and second electrical signals are respectively converted into first and second digital signals by a converter module. The correlation step is then a digital correlation step applied to said digital signals.

In this situation, there may be provision for mathematically processing the first and second digital signals before correlation (see below), notably in order to eliminate the impact of the frequency reduction and filtering induced by the receiver system.

The digital correlation step may include:
 at least one step of calculating from the first and second digital signals at least one digital correlation signal representative of the electromagnetic radiation from the intersection of the first and second parts of the body or article;
 at least one step of creating by calculation at least one third digital signal representative of the electromagnetic radiation from an area neighboring the first and/or second parts;
 at least one step of calculating from the first and/or the second digital signal and the third digital signal at least one digital correlation signal representative of the electromagnetic radiation from the intersection of the first and/or second parts of the body or article with the adjoining area.

Moreover, the step of creating by calculation the third digital signal representative of the electromagnetic radiation from the area adjoining the first and/or second parts may include a step of time-shifting or phase-shifting the first and/or second digital signal.

In a second variant the correlation step is an analog correlation step applied directly to the first and second electrical signals. This step then generates at least one electrical output signal that is converted into at least one digital signal by a converter module with a view to processing by the processor unit.

In this situation, the correlation step may include creating two electrical signals corresponding to the sum and to the difference of the first and second electrical signals.

Other features and advantages of the invention become more clearly and completely apparent on reading the following description of preferred embodiments of the device and implementations of the method, which description is given by way of non-limiting example only and with reference to the appended drawings, in which.

Figure 1A:
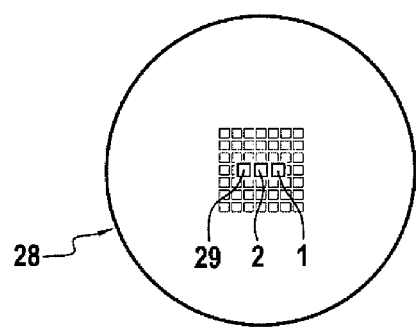
FIGS. 1A, 1B show diagrammatically an example of detecting electromagnetic radiation from portions of a body or an article.

The purpose of a radiometric device is to measure the noise power generated by articles.

Conventionally, in a device of this kind, an antenna receives the noise power radiated by an article present in the scene and having a certain temperature. This noise power is transmitted to a receiver that converts it into a DC voltage of value that is proportional to the temperature. Prior or in situ calibration of the system makes it possible to associate this voltage with the real value of the temperature of the article.

When detection is of the analog type, the sensitivity of such a device is inversely proportional to the square root of the product of the integration time (measurement time) of the integrator multiplied by the bandwidth of the system:

$$\delta T = T_{sys}/\sqrt{(B\tau)}$$

where:
 $T_{sys}$ is the noise temperature of the system between the antenna and the square-law detector;
 B is the bandwidth of the receiver;
 $\tau$ is the integration time of the integrator.

Consequently, if it is desired to reduce sensitivity without significantly increasing integration time, a receiver is required with as great a bandwidth as possible, combined with the lowest possible system noise temperature.

Whereas known devices seek to operate on the bandwidth B and the integration time $\tau$ to increase B$\tau$ and thus to reduce $\tau T$ (and therefore increase sensitivity), the device of the invention operates on $T_{sys}$ using the correlation referred to above and described in more detail below.

Reducing $T_{sys}$ reduces $\delta T$ (and thus increases sensitivity) without increasing the bandwidth B or the integration time $\delta$. Similarly, reducing. $T_{sys}$ reduces the bandwidth B and/or the integration time $\tau$ without increasing $\delta T$, and thus without reducing sensitivity.

When detection is of the digital type, the sensitivity of the device is inversely proportional to the square root of the number of samples processed over a given time:

$$\delta T = T_{sys}/\sqrt{N}$$

where:
 $T_{sys}$ is the noise temperature of the system between the antenna and the analog-digital converter;
 N is the number of samples received corresponding to the product of the sampling rate of the converter multiplied by a given time.

Consequently, to reduce sensitivity without significantly increasing acquisition time, a receiver with the lowest possible noise and an analog-digital converter having the highest possible sampling rate are required.

Once again, although known devices seek to act on N by increasing it in order to reduce $\delta T$ (and thus improve sensitivity), the device of the invention acts on $T_{sys}$ by the correlation method referred to above and described in more detail below.

Reducing $T_{sys}$ reduces $\delta T$ (thus increasing the sensitivity) without increasing N. Likewise, reducing $T_{sys}$ reduces N without increasing $\delta T$, and thus without reducing sensitivity.

Since the object of the invention, is a device able to detect very small articles by measuring the noise power they emit, this device must have a radiation pattern of its antenna or antennas with the lowest possible half-power aperture angle.

Moreover, the secondary lobes of the radiation pattern of the antenna must be as small as possible.

Figure 1B:
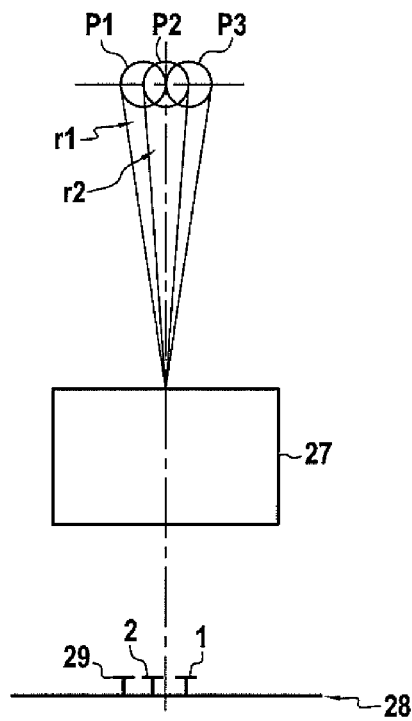

Equally, each individual pixel P1, P2, P3, P4, i.e. the area of the scene seen by each antenna 1, 2, 29, must be made discrete by scanning, either mechanically or electronically (see FIGS. 1A and 1B).

Mechanical scanning means steering the radiation pattern of the optics-and-antenna system through two angles via a mechanical element enabling the scene to be observed dynamically by movement in two directions $\underline{x}$ and $\underline{y}$ in the plane of the scene.

Electronic scanning means time-shifting a signal picked up by one antenna relative to the signal picked up by another antenna. This implies that the two antennas observe a common scene area, thus implying total or partial correlation of the signals.

Thus time-shifting has the effect of reducing the common area of the scene. By effecting a plurality of time-shifts and combining the results obtained, it is possible to pixelize the scene.

Moreover, since the object of the invention is to produce a device with the smallest possible sensitivity, with the aim of detecting the smallest temperature variations, this device requires highly directional antennas that have a very high gain and the lowest insertion losses.

Also, the inherent noise of the receivers must be as low as possible or even zero.

Equally, the calibration of the system must be very precise in order to take account periodically of variations in the gain of the receiver during measurements.

Furthermore, with analog processing, as explained below, there is at the output of the square-law detector (i.e. at the output of the receiver) an integrator having an integration constant τ that must be high to increase sensitivity.

With digital processing, as also explained below, there is at the output of the square-law detector an analog-to-digital converter having a sampling rate that must be high to increase sensitivity and spatial resolution.

As shown diagrammatically in FIG. 1A, the device of the invention includes an optical element 27 having characteristics that are preferably determined in favor of the portability of the device.

The optical element 27 may be a lens, for example.

By way of example, the radiating elements 1, 2, 29 are printed antennas 1, 2, 29 (patch, Yagi, periodic log, etc.) of topology that is adjusted to achieve the required resonant frequency.

These antennas 1, 2, 29 are disposed on a support 28 and connected to the respective receivers.

FIGS. 1A and 1B show the combination of the optical element 27 plus the printed antennas 1, 2, 29 together with a simplified explanation of the radiation principle. In this example, the matrix of antennas 1, 2, 29 consists of 7×7 antennas 1, 2, 29 (FIG. 1A).

The antenna 2 situated at the center of the matrix radiates on the axis perpendicular to the plane of the optical element 27. The antenna 29 situated to the left of the central antenna 2 radiates on an axis inclined to the right relative to the axis perpendicular to the plane of the optical element 27, and the antenna 1 situated to the right of the central antenna 2 radiates on an axis inclined to the left relative to the axis perpendicular to the plane of the optical element 27.

To obtain an optimum area of overlap between two adjacent antennas (see FIGS. 2A and 2B), it is necessary to position the antennas 1, 2, 29 judiciously. This area of overlap preferably corresponds to half the area covered by an antenna.

According to the invention, as shown in two examples described with reference to FIGS. 3 and 4, a respective receiver module 5, 6 is therefore associated with each receiver antenna 1, 2.

The two antennas 1, 2 are respectively adapted to capture electromagnetic radiation $r_1$, $r_2$ (see FIGS. 1A and 1B) from portions P1, P2 (see also FIGS. 1A and 1B) of a body or an article and to convert this radiation into first and second signals $s_1$, $s_2$ representative of the radiation $r_1$, $r_2$.

Thus the two receiver modules 5 and 6 are respectively adapted to receive the first and second signals $s_1$, $s_2$ representative of the radiation $r_1$, $r_2$ and to convert these signals $s_1$, $s_2$ into first and second electrical signals $se_1$, $se_2$.

What is more, a digital processor unit 3 is provided for responding to the first and second electrical signals $se_1$, $se_2$ to create one or more digital signals representative of the electromagnetic radiation in order to display these digital signals as an image of the body or the article on a display device that is not shown in the figures.

This digital processor unit 3 includes a memory 18 and a microprocessor 19 connected to a field programmable gate array (FPGA) logic circuit 20.

Finally, a correlator module 4 is provided for directly or indirectly correlating the first and second electrical signals in order to form one or more signals representative of the electromagnetic radiation from the intersection of the parts P1 and P2.

Figure 5:
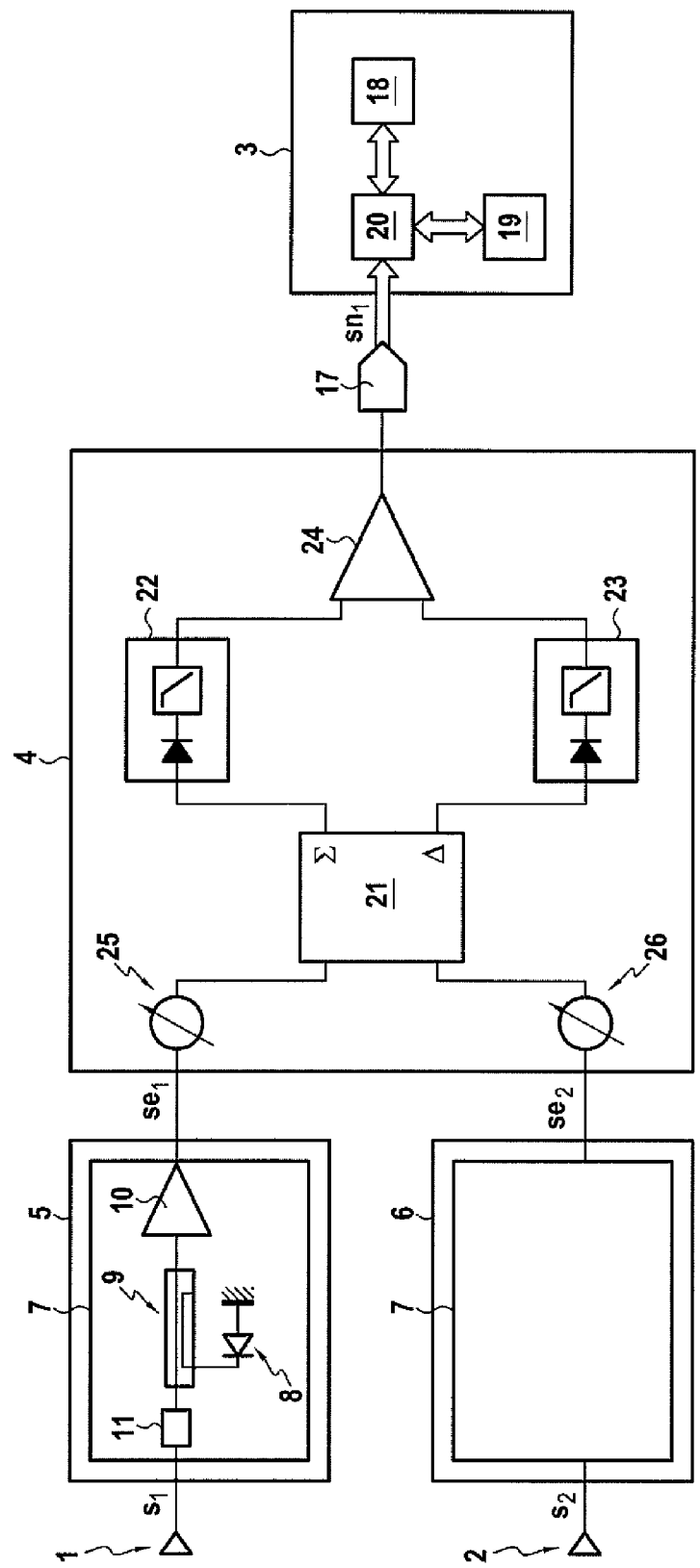
FIG. 5 shows diagrammatically a second embodiment of the device of the invention.

As explained in more detail below, the FIG. 3 and FIG. 5 configurations differ depending on whether the correlation effected by the correlator module 4 is digital (FIG. 3) or analog (FIG. 5).

Each receiver module 5, 6 may contain an antenna-receiver transition module 7.

The transition module 7 preferably includes a transition element 11 and a noise injector diode 8 connected to a unidirectional coupler 9. The coupler 9 is connected to a low-noise amplifier 10.

The combination of the unidirectional coupler 9 and the noise diode 8 is used periodically to determine the gain of the receiver 5, 6.

The low-noise amplifier 10 operates in the millimeter or even sub-millimeter band of wavelengths. This amplifier 10 should preferably have a maximum gain and a minimum noise factor to limit the noise temperature of the receiver 5, 6 and should above all consume minimum power to prevent self-heating of the receiver 5, 6.

Figure 3:
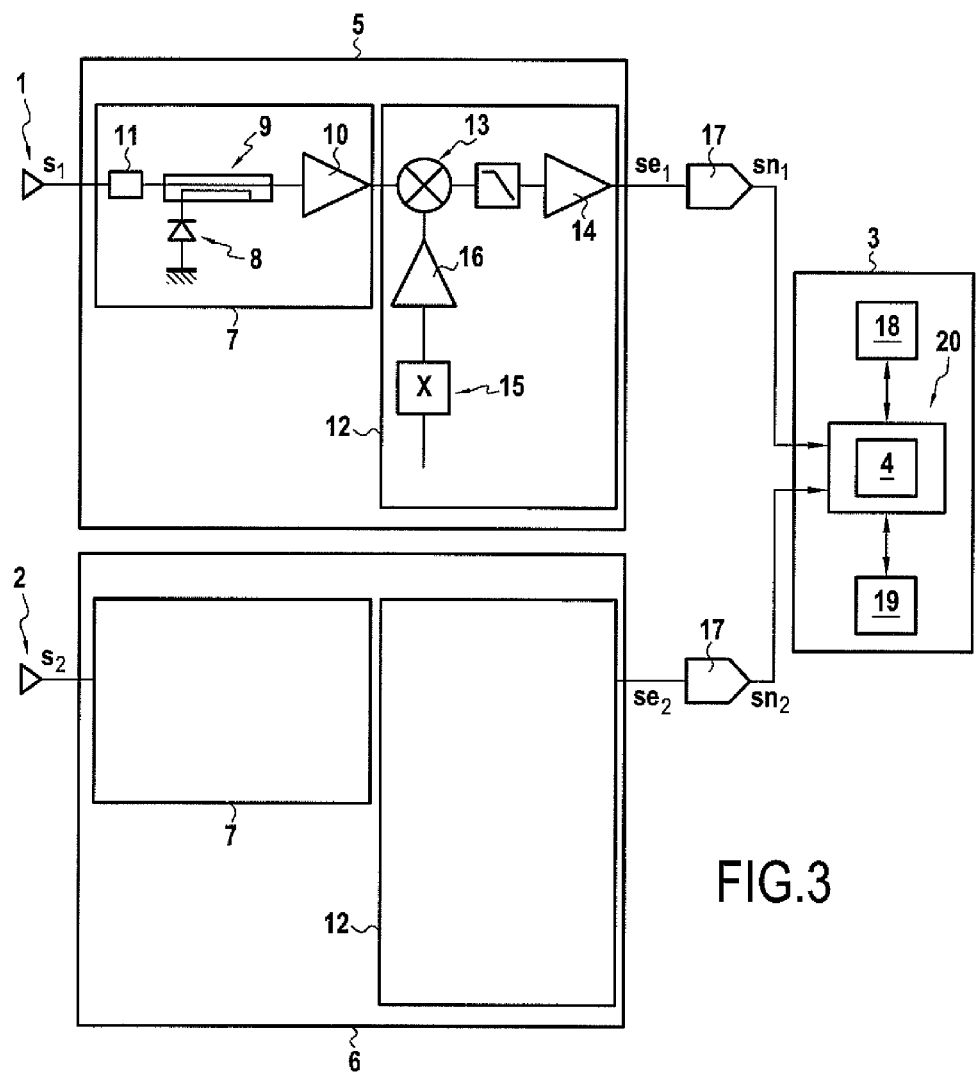
FIG. 3 shows diagrammatically a first embodiment of the device of the invention.

As in the embodiment shown in FIG. 3, a frequency reducer module 12 may be provided at the output of the transition module 7.

This passive or active frequency reducer module 12 transposes the signals coming from the antennas 1, 2 into a particular frequency band.

This frequency reducer module 12 preferably includes a millimeter-band mixer 13 and a low-frequency low-noise amplifier.

Thus the output signal from the mixer 13 is filtered and then strongly amplified in order to be digitized and stored in memory.

The mixer 13 therefore receives at its inputs the signal from the transition module 7 and a signal from the local oscillator.

The signal from the local oscillator is preferably not generated directly in the millimeter (or sub-millimeter) band of wavelengths.

In fact, all the local oscillators of the set of receivers 5, 6 must be synchronous, which implies the use of the same source. The nominal power of this signal from the local oscillator in each frequency reducer module 12 is generally close to 10 decibels referenced to one milliwatt (dBm). Because of this, in an example with 49 receivers 5, 6 (i.e. a matrix of 7×7 antennas), the source dedicated to generating the local oscillator signal for the set of receivers must generate approximately 1 watt (W) of power.

This power is very high and difficult to achieve with a Gunn diode source, for example, or a solid state amplifier.

This is why a Gunn diode source (not shown) is preferably used operating in the centimeter band of wavelengths and delivering sufficiently high power with low phase noise. The signal coming from the centimeter-band source reaches a millimeter-band multiplier 15 before being amplified by a millimeter-band (or sub-millimeter-band) medium-power amplifier 16 to achieve a power sufficient to drive each of the mixers 13.

Moreover, it is feasible to produce a mixer 13 requiring a low-power local oscillator signal by using antimony technology, for example, combined with an Esaki diode or a heterobipolar transistor (HBT) mixer architecture.

Heterostructures based on antimony semiconductors enable tunnel diodes to be developed that generate non-linearities at a very low bias, an essential physical criterion for developing a mixer receiving low power from a controlling local oscillator.

It should be noted that, with mono-harmonic signals, the greater the frequency reduction for a given sampling rate, the better the spatial resolution for spatial scanning.

In contrast, with noise signals, i.e. multi-harmonic signals, to obtain an improved spatial resolution for spatial scanning by increasing the frequency reduction for a given sampling rate it is necessary to process the signals, notably by compensating the impact of the frequency reduction for each harmonic of the frequency-reduced signal and, prior to correlation, is it necessary to deconvolute the filtering effects of the antenna and the receiver module.

In fact, the time expansion phenomenon induced by frequency reduction via a mixer is entirely valid if the frequency-reduced signal is of the mono-harmonic type.

Accordingly, if a 100 GHz sinusoidal signal is presented to the input of the single sideband (upper sideband) mixer 13, for example, and the frequency of the signal from the local oscillator is 99.99 GHz, the signal present at the output of the mixer 13 has a frequency of 10 MHz.

Consequently, the reduction ratio between the signal at the input of the mixer 13 and the signal at the output of the mixer 13 is equal to 10,000.

If a time-shift of 2 ps is imposed on the radio-frequency signal at the input of the mixer 13, this results in a time-shift 10,000 times greater at the output of the mixer 13, i.e. a shift of 20 ns.

Consequently, if the useful signal at the input of the mixer 13 is a mono-harmonic signal, the use of the frequency reducer module 12 makes it possible to use ADCs with sampling rates that are not too high (<1 GS/s).

In contrast, if ADCs with sampling rates above 200 GS/s are available, then frequency reduction is no longer necessary.

However, in the invention, the signals collected and measured by the antennas 1, 2 are radiometric signals, i.e. noise signals having finite bandwidth (imposed by the bandwidth of the antennas and the associated receivers). This signal is therefore a multi-harmonic signal.

In order to exploit the physical properties induced by the frequency reducer of the module 12 (time compression or expansion, depending on the conversion direction), it is necessary for the measured signals to be mono-harmonic.

Because of this, in the context of the invention, it is necessary to generate a mono-harmonic signal and to use it to illuminate the scene.

In other word, it is necessary to render the system "active" while retaining the digital spatial scanning and acquisition method of the present invention.

As indicated above, in a radiometric configuration, the camera measures the natural microwave thermal radiation emitted by a body at a temperature different from absolute zero. This thermal radiation is equivalent to a noise signal including a number of harmonics greater than 1.

For example, if a noise signal with a frequency bandwidth of 1 GHz centered on 99.5 GHz is injected into the input of the mixer 13 and the frequency of the local oscillator is 99 GHz, the signal present at the output of the mixer 13 has a frequency bandwidth of 1 GHz centered on 0.5 GHz.

The frequency of the 100 GHz harmonic of the input signal of the mixer 13 is lowered to that of the 1 GHz harmonic at the output of this mixer 13. This represents a reduction factor of 100.

In contrast, the reduction factor for a 99 GHz harmonic of the input signal of the mixer 13 is infinite since the frequency at the output of the mixer 13 is zero.

Figure 8:
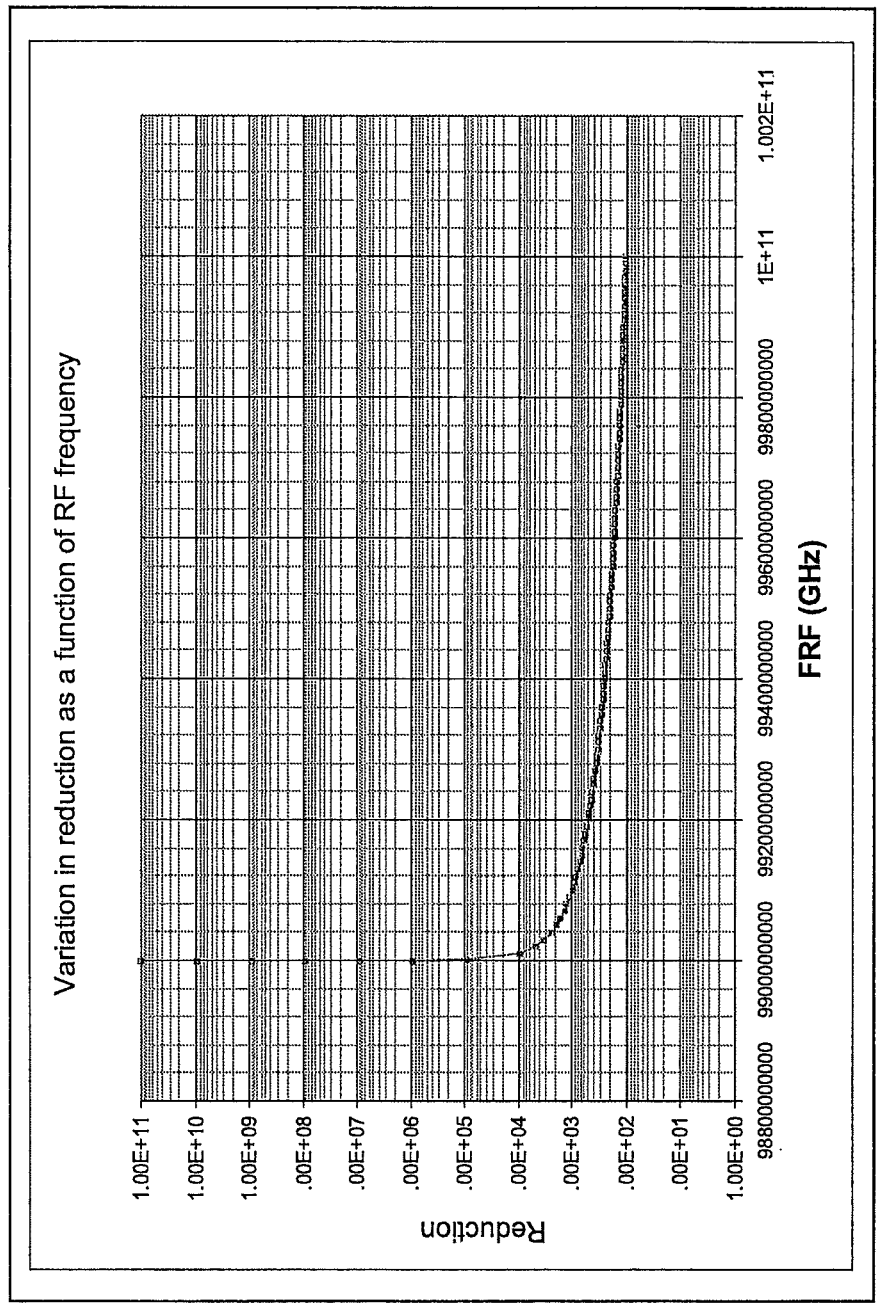
FIG. 8 shows the variation of the reduction factor A of a 1 GHz bandwidth noise signal centered at 99.5 GHz as a function of the frequency FRF of the input signal of the mixer 13.

Thus it is found that the reduction factor is not at all constant through the frequency band, as shown in FIG. 8, which shows the variation of the reduction factor A of a 1 GHz bandwidth noise signal centered at 99.5 GHz as a function of the frequency FRF of the input signal of the mixer 13.

The variation of the reduction factor has a major impact because a time-shift of 5 ps of the noise signal at the input of the mixer 13 also gives rise to a time-shift of 5 ps in the signal at the output from the mixer 13.

Consequently, in terms of time expansion, the mixer is no longer of benefit for a multi-harmonic signal. In fact, in this configuration, to achieve a resolution of 5 ps, it is necessary to use an analog-digital converter having a sampling rate of 200 GS/s.

In this context, the cost of the device increases exponentially with the increase in the sampling frequency.

Processing of the signal may be added to counteract the impact of the large variation in the reduction factor as a function of the frequency of the signal at the input of the mixer 13.

Starting from the frequency of the signal from the local oscillator (which is 99 GHz in this example), the reduction is determined for each harmonic of the output signal of the mixer 13.

To do this, the Fourier transform of the noise signal present at the output of the mixer 13 is obtained, and for each harmonic the inverse of the reduction factor is applied. The spectrum of the signal at the input of the mixer 13 is reconstructed in this way.

Obtaining the inverse Fourier transform of the reconstituted spectrum then enables a good approximation to be obtained of the temporal evolution of the noise signal at the input of the mixer 13 before frequency reduction, but with a sampling frequency of 198 GS/s, i.e. one sample every 5.05 ps.

Thus the proposed digital processing enables the required temporal resolution to be achieved using an analog-digital converter with a much lower sampling rate, which is 2 GS/s in this example.

Figure 9:
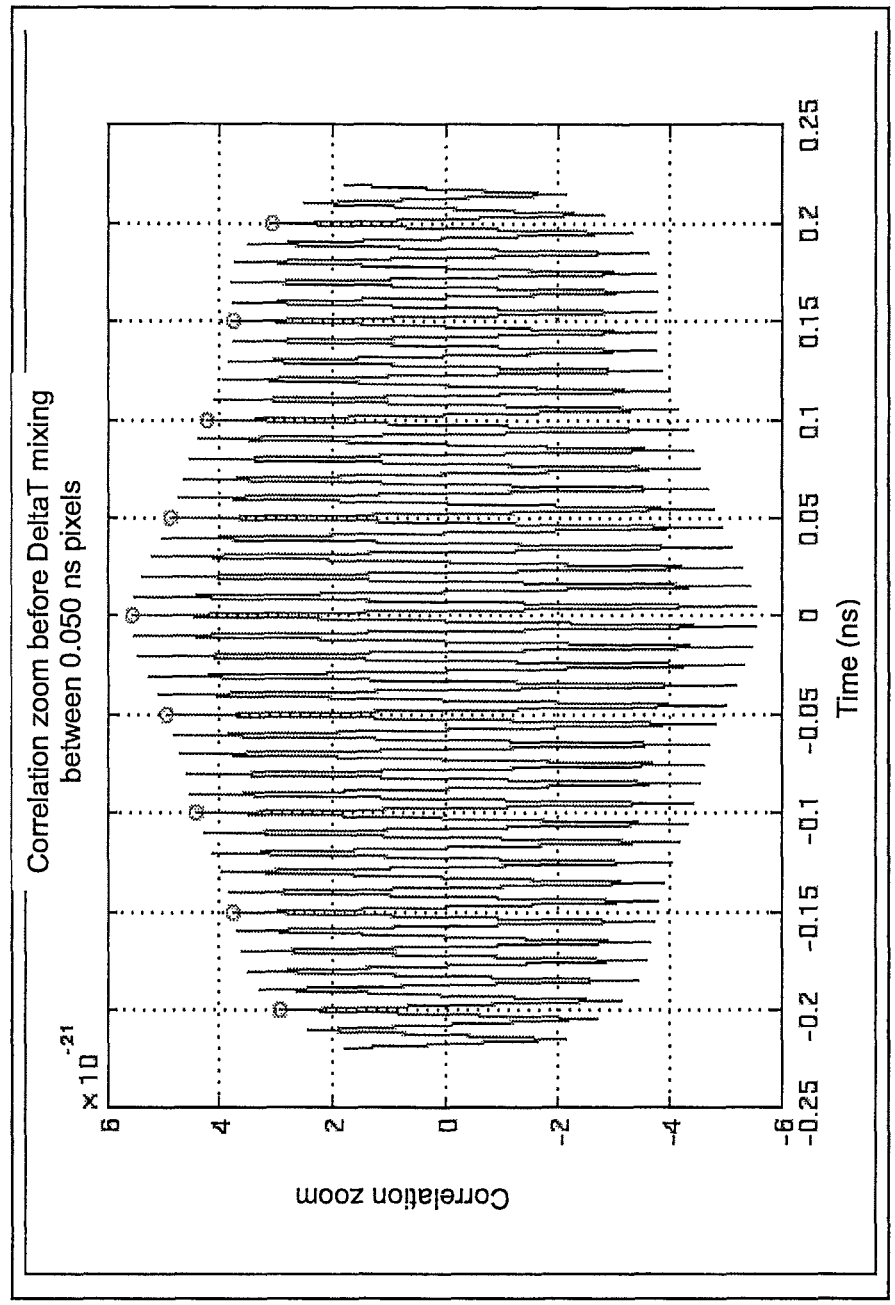
FIG. 9 shows the correlation product of the signals emitted by the scene and picked up by two antennas with a bandwidth equal to 10 GHz centered on 95 GHz and without frequency reduction.
Figure 10:
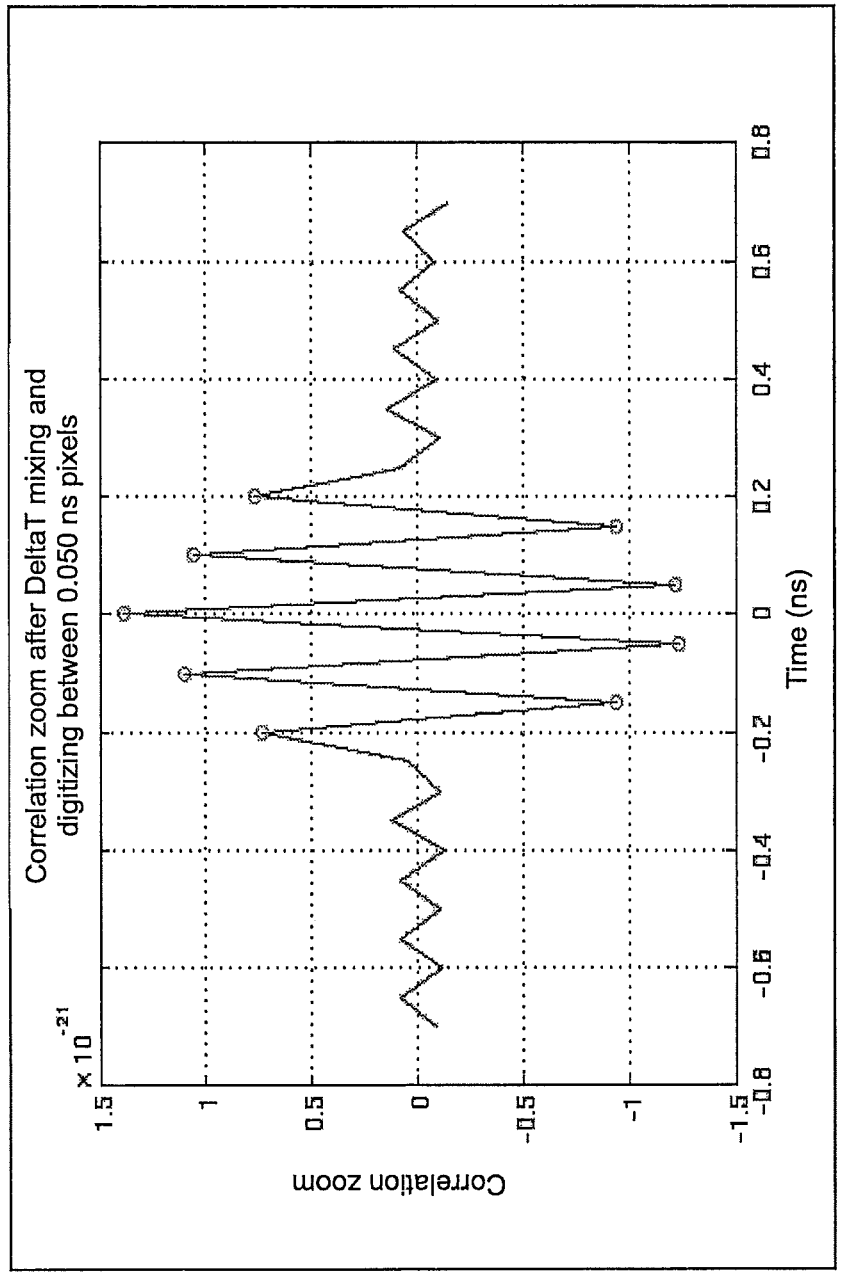
FIG. 10 shows the correlation product of the signals emitted by the scene and picked up by two antennas with a bandwidth equal to 10 GHz centered on 95 GHz and using frequency reduction (employing a mixer 13 having a local oscillator signal frequency of 90 GHz) and a sampling rate of 20 GS/s.
Figure 11:
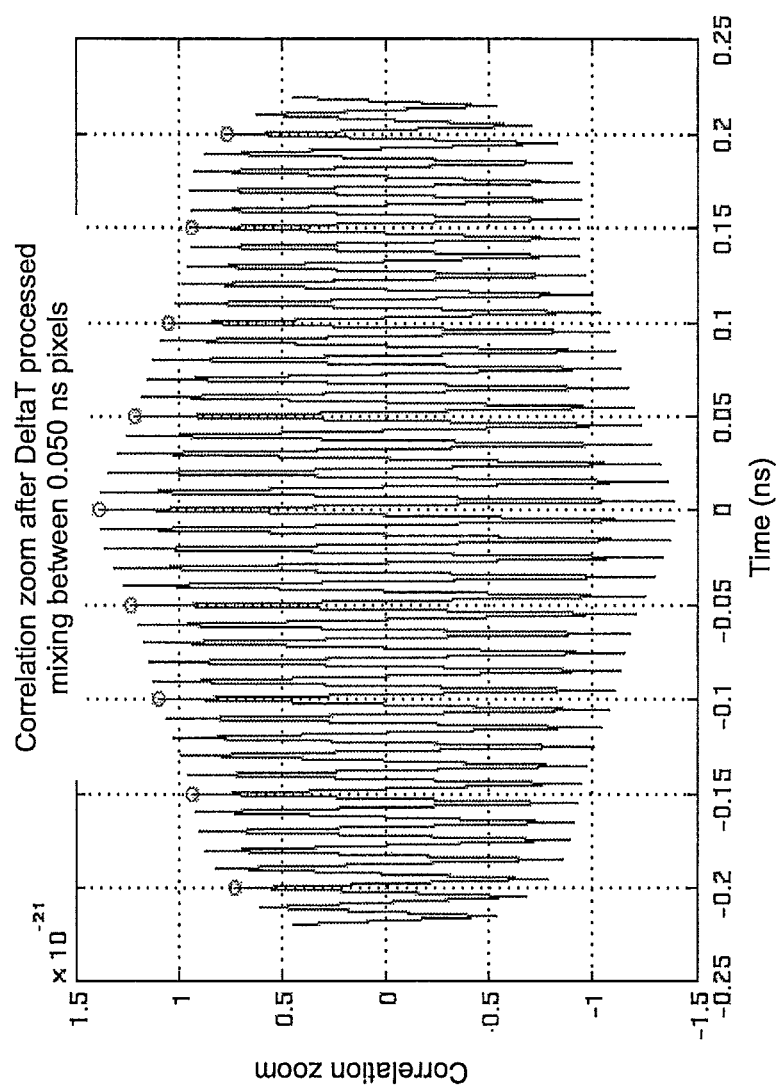
FIG. 11 shows the result of digital correlation of time-varying signals of the invention after the time variation of two signals is obtained from the inverse Fourier transform.

The three graphs FIGS. 9, 10 and 11 illustrate what is explained above. In each of these figures, the values plotted up the ordinate axis are values of the normalized correlation product, and therefore have no units.

FIG. 9 shows the correlation product of the signals emitted by the scene and picked up by two antennas with a bandwidth equal to 10 GHz centered on 95 GHz and without frequency reduction. In this example, the scene corresponding to the area of overlap seen by the two antennas is modeled by nine elementary areas (pixels) of varying temperature.

Each peak amplitude is proportional to the temperature of each pixel. The temporal position of each main correlation peak (indicated by a circle) corresponds to the geographical position of each pixel.

In this example, note the presence of secondary peaks around each correlation peak, linked to the narrow bandwidth. The narrower the bandwidth, the more difficult it is to distinguish between close pixels. The trend of the envelope of the correlation product nevertheless represents the temperature profile of the scene.

Note also that the negative values of the correlation product are linked to the digitization of the pixels (simulation artifacts).

FIG. 10 shows the correlation product of the signals emitted by the scene and picked up by two antennas with a bandwidth equal to 10 GHz centered on 95 GHz and using frequency reduction (employing a mixer 13 having a local oscillator signal frequency of 90 GHz) and a sampling rate of 20 GS/s.

As may be seen on comparing FIG. 10 and FIG. 9, the correlation product after frequency reduction is not representative of the trend of the temperature profile of the scene.

Also, the Fourier transform of the two sampled and frequency-lowered signals is obtained.

Knowing the local oscillator frequency (which is 90 GHz in this example), the reduction factor applied to each harmonic is determined and inverse processing works back to the spectrum of the signal before frequency reduction.

The time variation of the two signals is then obtained from the inverse Fourier transform. These time-varying signals are then correlated digitally. The results are shown in FIG. 11.

As may be seen on comparing FIG. 11 and FIG. 9, the signal processing described above enables the temperature profile of the scene to be reconstituted, even after frequency reduction and digitization.

Moreover, this processing makes it possible to achieve adequate time resolution using an ADC with a conservatively specified sampling rate, and thus of lower cost, relative to the required spatial resolution.

In the context of the invention, it is not necessary to use ADCs having a large number of coding bits. In fact, the correlation product of signals digitized by 1-bit ADCs gives results identical to that produced with signals digitized by 10-bit ADCs.

This is particularly important because it makes it possible to give preference to the sampling frequency over the number of coding bits. This also makes it possible greatly to reduce cost and electrical power consumption, and thus to limit heating of the system.

What is more, the narrower the bandwidth of the signal at the output of the mixer 13, the greater the amplitude of the secondary peaks. Likewise, the lower the upper cut-off frequency of the bandwidth of the signal at the output of the mixer 13, the greater the spreading of the (main and secondary) correlation peaks.

To limit these two phenomena, the influence of the filtering effect induced by the receiver modules may be deconvoluted. The impact of deconvolution is shown in FIG. 12.

Figure 12:
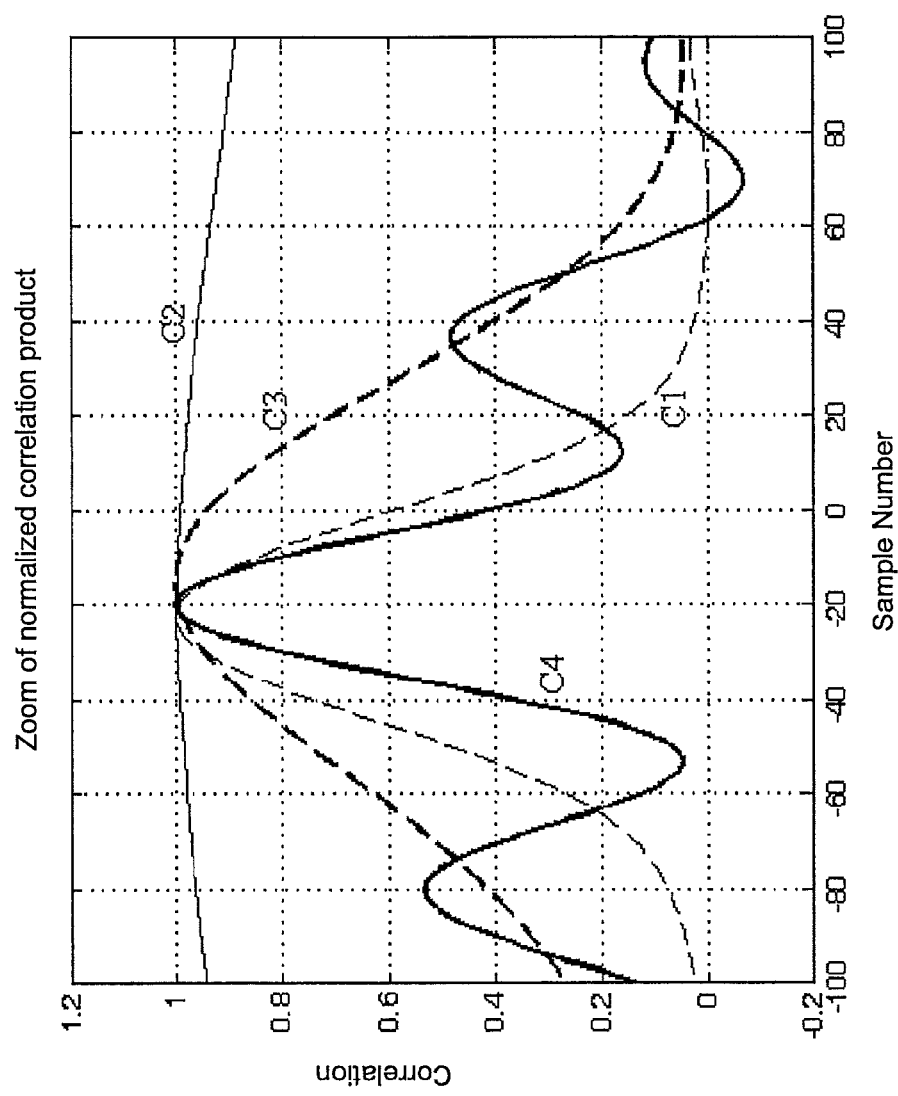
FIG. 12 shows the impact of deconvolution of the influence of the filtering effect induced by the receiver modules of the invention.

In FIG. 12, the values up the ordinate axis are values of the normalized correlation product, and are therefore without units, and the values along the abscissa axis are sample numbers.

In this FIG. 12, the curve C1 shows the correlation product of the signals emitted by the single pixel of the scene without filtering, the curve C2 shows the correlation product of the signals emitted by the single pixel of the scene with filtering, the curve C3 shows the correlation product of the signals emitted by the single pixel of the scene with filtering and then deconvolution of the transfer function of the filter up to 10 MHz, and, finally, the curve C4 shows the correlation product of the signals emitted by the single pixel of the scene with filtering and then deconvolution of the transfer function of the filter up to 20 MHz.

The phenomenon of spreading of the correlation peak caused by the filtering is clearly seen on comparing the curve C2 and the curve C1 and the great reduction in the spreading of the correlation peak because of deconvolution is clearly seen on comparing the curves C3 and C4 with the curve C2.

This technique therefore makes it possible to reduce the bandwidth of the signal at the output of the mixer 13 without reducing spatial resolution.

In the FIG. 3 example, there is no need to use frequency-reducer modules 12 with homodyne receiver modules 5, 6.

Compared to a device with receiver modules 5, 6 with frequency-reducer modules 12, this type of device with homodyne receiver modules 5, 6 and with no frequency-reducer module 12 is of benefit in terms of overall size, power consumption, cost, and accuracy. Moreover, it does away with much of the digital processing of the signals after correlation and thus reduces the calculation time and power of the device.

However, it implies using a millimeter-band (or even sub-millimeter-band) analog-digital converter 17 at the output of each receiver module 5, 6 with a high sampling rate in order to comply with Shannon's rule (sampling rate greater than twice the frequency of the millimeter-band signal).

In this example as shown in FIG. 3, in both situations, i.e. with and without a frequency-reducer module 12, the analog-digital converter 17 must offer fast sampling in order to enable spatial scanning with the best possible spatial resolution.

In fact, spatial scanning of the scene is effected by the correlator module 4 producing the correlation product of the signals coming from two adjacent antennas 1, 2 and time-shifting one signal relative to the other.

Given that the signals are digitized, the minimum time-shift is a shift of one sample. Consequently, the higher the sampling rate, the narrower the time-shift between two samples and the better the spatial resolution for spatial scanning.

Nevertheless, if a frequency-reducer module 12 is used with mono-harmonic or multi-harmonic signals processed by the mathematical approach described above (compensation of frequency reduction and deconvolution), a kind of "time expansion" occurs after a certain reduction ab, with the result that a time-shift of x seconds in the low-frequency signal generates a time-shift with a duration (in seconds) of x/ab of the millimeter-band signal. Thus, once again, the higher the sampling rate, the narrower the time-shift between two samples and the better the spatial resolution for spatial scanning.

With reference to the example shown in FIG. 3, the receiver modules 5, 6 and the digital processor unit 3 may preferably be on the same semiconductor chip. The combination of the analog receiver modules 5, 6 and the digital processor unit 3 may thus be developed using the MMIC technology, depending on the fabrication technology used (III-V semiconductor, SiGe, Si, etc.).

The correlation effected by the correlator module 4 may be digital (FIG. 3) or analog (FIG. 5).

As already stated above, mechanical spatial scanning seriously degrades radiometric sensitivity because of the multiple measurements effected to reconstitute the image.

In fact, if it is required for example that the minimum number of pixels constituting an image of 20×20 $cm^2$ is 130× 130 pixels, this corresponds to an area of 5 $mm^2$ for each pixel.

Assuming for example that the optical element used is as described above (for example 10 cm diameter, matrix of 7×7 patch antennas), the area of the overlap between two adjacent antennas (FIG. 2A) must be of the order of 2.5×5 $cm^2$.

The analog correlation product may be obtained only between signals coming from two adjacent antennas having a half-power overlap area linked to the architecture of the analog correlator (FIG. 5).

Figure 2A:
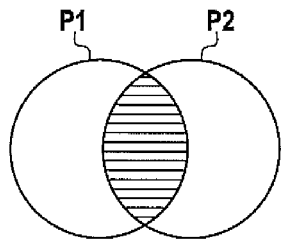
FIGS. 2A, 2B show diagrammatically the radiometric detection resolution of the device of the invention in the example from FIGS. 1A and 1B with the overlap areas highlighted.

Considering two adjacent antennas having an overlap area, the size of the pixel after obtaining the analog correlation product is less than 2.5×5 $cm^2$ (see FIG. 2A).

To obtain the minimum number of pixels in the image referred to above, it is necessary to effect five shifts along a first axis plus 10 shifts along a second axis, i.e. 50 shifts in total, given that an analog correlation product is obtained for each position.

The digital correlation product may be obtained between signals coming from all adjacent antennas having a half-power overlap area (FIG. 3), because correlation is effected a posteriori.

Figure 2B:
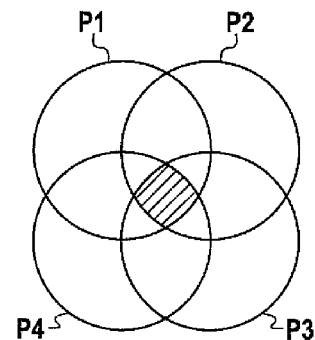

Considering four adjacent antennas having an overlap area, the size of the pixel after obtaining the digital correlation product is less than 2.5×2.5 cm² (see FIG. 2B). No mechanical movement is necessary here because the image is digitized by digitizing all the overlap areas constituting the "raw" image by obtaining the digital correlation product for different values of τ (electrical delays between the signals coming from two antennas having an overlap area).

In order to improve the pixelizing of the image, other digital processing may be carried out by the processor unit 3, such as deconvolution, filtering, etc., regardless of the correlation method used.

With digital correlation (FIG. 3), the digital correlator module 4 is preferably integrated into the digital processor unit 3 in the FPGA logic module 20 and receives at its input the digital signals $sn_1$ and $sn_2$ coming from the analog-digital converter modules 17.

The digital correlation product calculated in this way is then:

$$Csn_1 sn_2(\tau) = \int_{+\infty}^{-\infty} sn_1(t) sn_2 * (t-\tau) dt$$

Accordingly, the digital correlation product of the signals coming from the two adjacent antennas 1, 2 enables the optimum overlap area to be obtained.

By varying the time constant τ (see above), the area of the overlap area varies, thus enabling spatial scanning of the scene.

As explained above, to obtain the digital correlation product, a specific architecture of the receiver module 5, 6 is provided, with the particular aim of obtaining phase and amplitude information for each signal in order to be able to obtain the correlation product.

Because of this, the signals coming from all the antennas 1, 2 of the matrix (see also FIGS. 1A and 1B) are preferably sampled separately.

With analog correlation (FIG. 5), the architecture of the device is different since the analog correlator module 4 is no longer integrated into the digital processor unit 3.

This architecture is still based on spatial scanning by mechanical movement, using a correlation product of signals coming from two adjacent antennas, implying the presence of an optimum overlap area as described above.

The major benefit of an analog correlator module 4 is that the receiver module 5, 6 integrates the radiometric signal over its entire bandwidth, thus enabling greater radiometric sensitivity to be obtained.

In fact, as the expression for the sensitivity of a radiometric receiver shows, the greater the bandwidth of the device, the lower the sensitivity:

$$\delta T = T_{sys}/\sqrt{(B\tau)}$$

However, for reasons of system complexity, the correlation product may be obtained only for signals coming from two adjacent antennas 1, 2, i.e. in only one spatial dimension (see FIG. 2A), in contrast to the device with the digital correlator module 4 that is able to produce the correlation product of signals coming from three or even four adjacent antennas in several spatial dimensions (see FIG. 2B).

Because of this, with a matrix of 7×7 antennas 1, 2 (see FIGS. 1A and 1B), it is necessary to produce 5 shifts in the direction corresponding to the position of the two antennas 1, 2 having signals that are correlated and 10 shifts in the other direction, i.e. 50 shifts in total.

If the optical system 27, patch antennas 1, 2, and receiver modules 5, 6 (see FIGS. 1A and 1B) have a bandwidth of 10 GHz, for a measurement time τ=0.2 s per position (excluding the calibration step) and an inherent noise temperature of the receiver modules 5, 6 of 1810 K, the radiometric sensitivity is around 0.04°.

This sensitivity value is highly beneficial since it is smaller than that obtained with a digital correlation device 4 and with a memory size of 1024 megabytes (MB).

To obtain this correlation product, the two receiver modules 5, 6 each associated with an antenna 1, 2 and having signals that must be correlated, must be as closely matched as possible in terms of phase and amplitude.

Furthermore, this analog correlation solution implies using wideband amplifiers.

The configuration of the device with the analog correlator module 4 is therefore described with reference to the example shown in FIG. 5.

Thus it includes receiver modules 5 and 6 associated with antennas 1 and 2 and each including a transition module 7, as already explained with reference to FIG. 3, but with no frequency reducer module 12.

Accordingly, signals from two adjacent antennas 1, 2 having an optimum overlap area are independently amplified by two amplifiers before being combined for the purposes of analog correlation.

The analog correlator module 4 and the receiver modules 5 and 6 may be on the same semiconductor chip.

The analog correlator module 4 thus includes a first sub-module 21 receiving the first electrical signal $se_1$ coming from the transition module 7 of the first receiver module 5 and the second electrical signal $se_2$ coming from the transition module 7 of the second receiver module 6 and generating two signals respectively corresponding to the sum and to the difference of the two input signals $se_1$ and $se_2$. Phase-shifters 25 and 26 are used to compensate the phase-shifts induced by the fact that the two receiver modules 5, 6 are not necessarily matched.

This first sub-module 21 is preferably a hybrid coupler 21 with two inputs.

The correlator module 4 also includes at least two square-law detector sub-modules 22, 23 adapted to receive at their inputs respective output signals from the first sub-module 21.

Accordingly, the mean square-law value of the two signals coming from the two outputs of the first sub-module 21 is measured by the two square-law detector modules 22, 23.

The output signals of the two square-law detector modules 22, 23 are preferably then amplified by a differential amplifier 24.

The signal at the output of the differential amplifier 24 therefore corresponds to the correlation product of the two signals coming from the two antennas 1 and 2.

This signal corresponds to the mean noise power emitted by the area of the scene that corresponds to the overlap area (intersection of parts P1 and P2, see FIGS. 2A and 2B).

This signal is then digitized by an analog-digital converter 17 before being stored in a random-access memory 18.

The presence of the two fixed phase-shifters 25 and 26 in the analog correlator module 4 at the output of the two millimeter-band amplifiers 10 in each transition module 7 of the receiver modules 5 and 6 enables the two channels to be phase matched in order to maximize the correlation product.

In order to reduce the gain of the millimeter-band amplifiers 10, or even to eliminate them from the system, it is possible to envisage using ultra-sensitive square-law detectors 22, 23, for example antimony-based Esaki tunnel diodes. Indeed, this diode technology enables detection of a millimeter-band signal power less than −80 dBm without using millimeter-band amplifiers. This power value corresponds to the power of a noise signal emitted by a body at room temperature over a bandwidth of 20 GHz.

Accordingly, the radiometric imagining method of the invention, which may be implemented by the device as described above, includes firstly a step of at least the first and second receiver modules 5, 6 receiving first and second signals $s_1$, $s_2$ representative of the radiation $r_1$, $r_2$ from first and second parts P1, P2 of a body or an article picked up by the first and second antennas 1, 2 and their conversion into electrical signals $se_1$, $se_2$.

Thereafter, the digital processor unit 3 creates from the first and second electrical signals $se_1$, $se_2$ at least one digital signal representative of the electromagnetic radiation $r_1$, $r_2$.

This digital signal is intended to be displayed on a display as an image of the body or the article.

The correlation of the first and second electrical signals $se_1$, $se_2$ is also effected with the aim of forming at least one signal representative of the electromagnetic radiation from the intersection of the first and second parts P1, P2 of the body or the article.

With digital correlation (FIG. 3), the first and second electrical signals $se_1$, $se_2$ are respectively converted into first and second digital signals $sn_1$, $sn_2$ by the converter modules 17 and these digital signals $sn_1$, $sn_2$, are then correlated after the above-described mathematical processing (Fourier transform, correction of the reduction factor for each harmonic, deconvolution of the filtering of the receiver system, and inverse Fourier transform) has been applied to them.

Each mathematical process is handled by a digital processor module (not shown in FIG. 3) implemented in the digital processor unit 3 in the same way as the digital correlator module 4, for example by a Fourier transform module, a reduction factor corrector module for each harmonic, a module for deconvoluting the filtering of the receiver system, and an inverse Fourier transform module.

Digital correlation includes at least one step of calculating from the first and second digital signals $sn_1$, $sn_2$ at least one correlation digital signal representative of the electromagnetic radiation from the intersection of the first and second parts P1, P2 of the body or article.

Digital correlation also includes at least one step of creating by calculation at least one third digital signal representative of the electromagnetic radiation from an area near the first and/or second parts P1, P2.

Digital correlation finally includes at least one step of calculating, from the first and/or second digital signal and also from the third digital signal, at least one correlation digital signal representative of the electromagnetic radiation from the intersection of the first and/or second parts P1, P2 of the body or article, with the adjacent zone.

In other words, it is possible by digital correlation to construct the digital information relating to the adjacent zone by calculation, without mechanical scanning.

To this end, the step of creating by calculation the 1.5 third digital signal representative of the electromagnetic radiation from the area adjoining the first and/or second parts P1, P2 itself includes a step of time-shifting or phase-shifting the first and/or second digital signal $sn_1$, $sn_2$.

Thus it is possible by digital scanning greatly to increase resolution.

All the signals coming from the antennas having an overlap area may be correlated by multiple digital correlation.

The image is then pixelized by making all the overlap areas discrete, producing the correlation product for different time-shifts (or phase-shifts).

As a result, a posteriori multiple digital correlation requires only one measurement for each antenna.

Figure 4A:
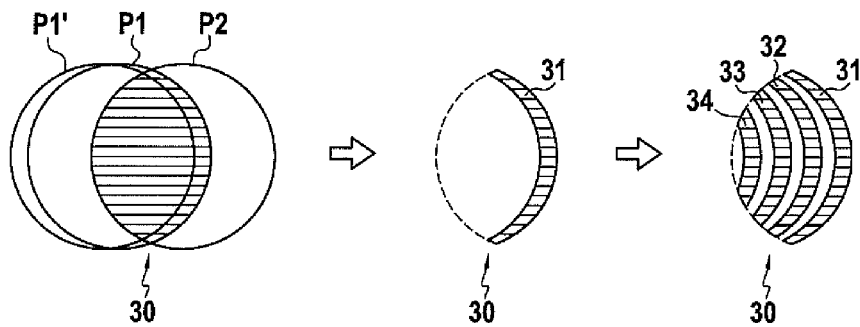
FIGS. 4A, 4B show diagrammatically the radiometric detection resolution of the device of the invention and the method of a posteriori multiple digital correlation.

By way of illustration, FIG. 4A shows the digital signal 30 representative of the intersection between two adjacent parts P1 and P2 obtained by correlating the signals representative of the parts P1 and P2.

Effecting a time-shift digitally creates mathematically the part P1' and its corresponding signal, which may then be correlated with the signal representative of the part P2 or with the signal representative of the intersection 30 of the parts P1 and P2. The result of this correlation corresponds to the strip 31.

Iterating this process for different values of the time-shift until a zero correlation product is obtained yields different strips 31, 32, 33, 34 corresponding to digitization of the initial overlap area 30.

Figure 4B:
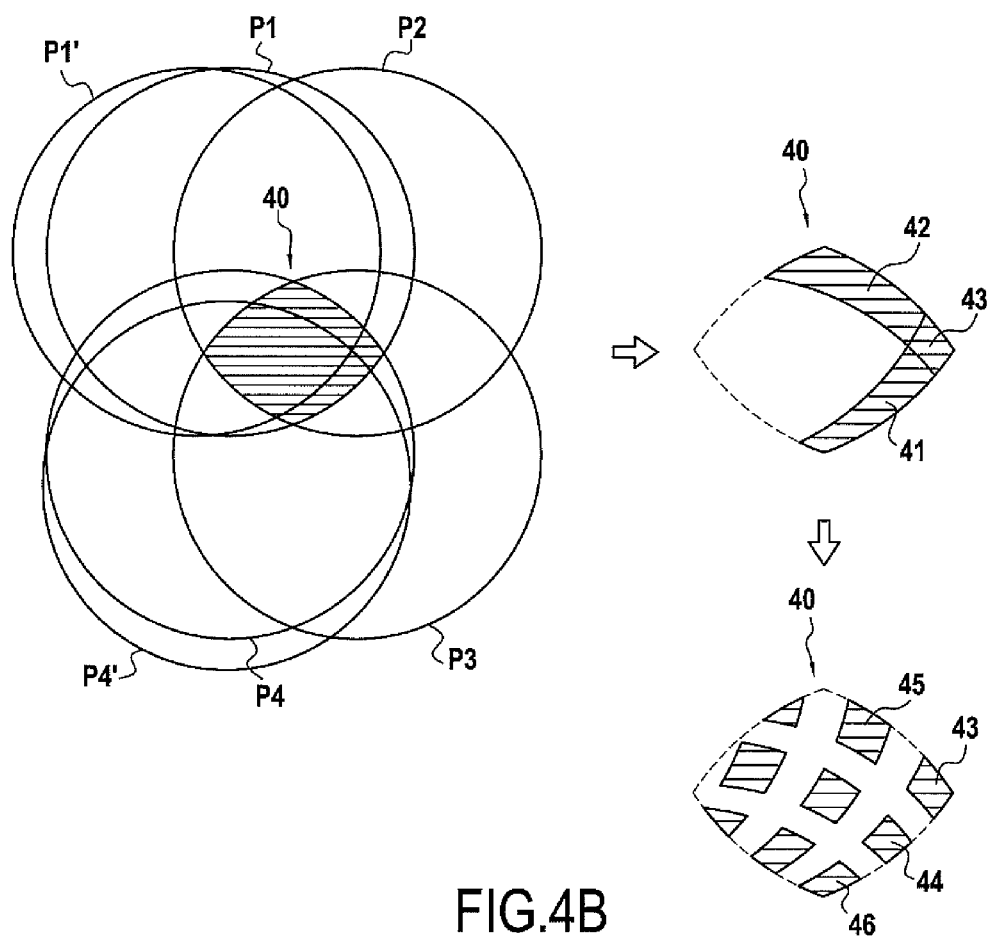

If this process is implemented for all the intersection zones of an antenna matrix in pairs, a matrix of discrete areas is obtained, as shown in FIG. 4B.

This FIG. 4B shows the digital signal 40 representative of the intersection between four adjacent parts P1, P2, P3, and P4 in, two directions obtained by correlating the signals representative of the parts P1, P2, P3, and P4.

Digitally producing a time-shift in a first direction mathematically creates the part P1' and digitally producing a time-shift in a second direction mathematically creates the part P4'.

The intersection 40 between the four adjacent portions P1, P2, P3, and P4 is then digitized in the form of the strips 41 and 42, the intersection of which forms an individual pixel 43.

Iterating this process for different time-shift values in each of the two directions until a zero correlation product is obtained yields pixels 43, 44, 45, 46 corresponding to making discrete areas in the initial overlap area 40.

Alternatively, with analog correlation (FIG. 5), the correlation step is applied directly to the first and second electrical signals $se_1$, $se_2$.

This analog correlation step generates at least one electrical output signal that is converted by the converter module 17 into at least one digital signal $sn_1$ that is processed by the processor unit 3, notably with a view to creating the image of the body or article.

This analog correlation step includes a step of creating two electrical signals respectively corresponding to the sum and to the difference of the first electrical signal and the phase-shifted second electrical signal.

Figure 6A:
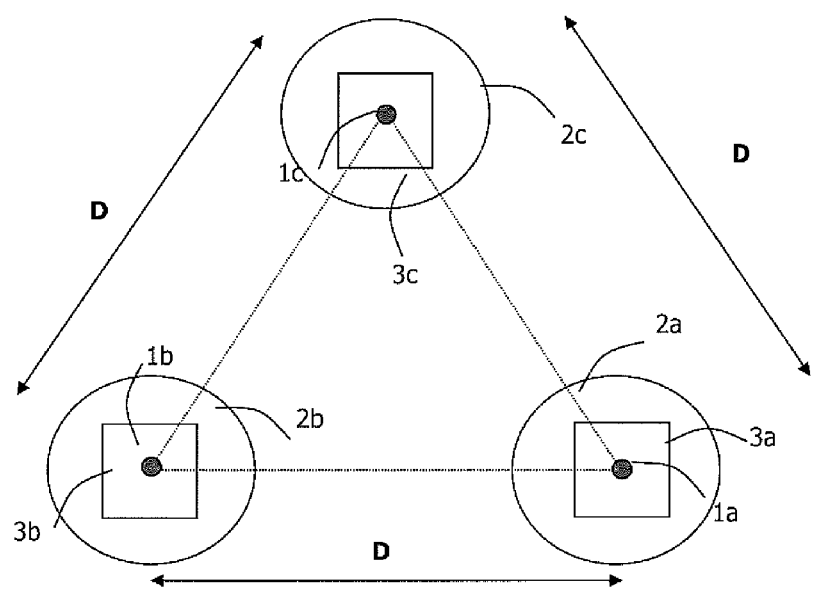
FIGS. 6A, 6B show diagrammatically another example of detecting electromagnetic radiation from parts of a body or an article.
Figure 6B:
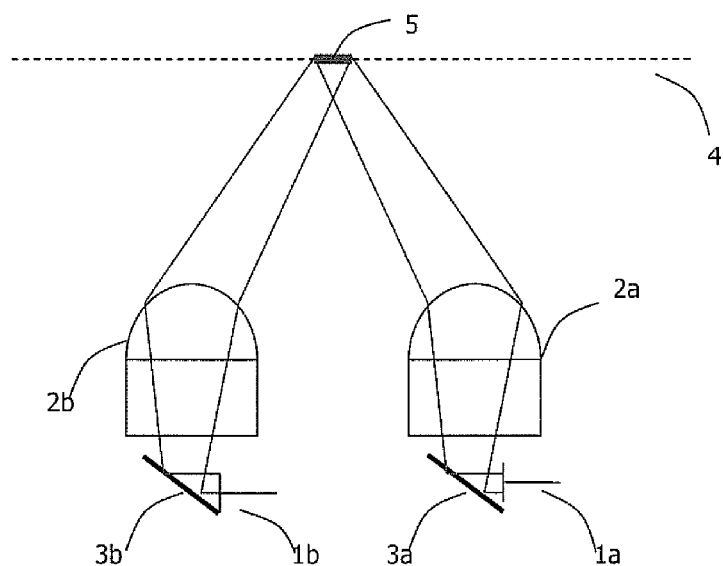

Another example of detection of electromagnetic radiation from portions of a body or an article is shown diagrammatically in FIGS. 6A and 6B.

In this example, the device includes at least two optical elements 2a, 2b, preferably three optical elements 2a, 2b, 2c, of characteristics that are preferably determined in favor of the portability of the device.

Each optical element 2a, 2b, 2c may be a lens, for example.

Each optical element 2a, 2b, 2c is associated with at least one radiating element 1a, 1b, 1c, for example a printed antenna (patch, Yagi, periodic log, etc.) with the topology of the antenna being adjusted to achieve the expected resonant frequency.

Between each optical element 2a, 2b, 2c and the radiating elements 1a, 1b, 1c there is at least one mirror 3a, 3b, 3c that can be inclined at two angles, enabling the angle of view of the device to be steered in the plane 4 of the scene 5.

To obtain the correlation product, it is necessary for at least two antennas to see the same area of the scene 5. In other words, the mirrors 3a, 3b, 3c are used to steer the beam from each antenna-and-optics system in order for these systems to see a common area of the scene.

In this configuration the optimum overlap area is defined by the total area viewed by each of the antennas.

The benefit of this device topology lies in the fact that the antennas are spaced by a distance D that is much greater than in the variant shown in FIGS. 1A, 1B having only one optical element. Because of this, analog-digital converters with much lower sampling rates may be used to achieve the same spatial resolution. In contrast, this topology is much more bulky, however.

Figure 7:
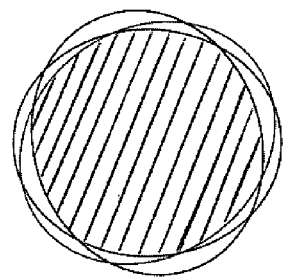
FIG. 7 shows diagrammatically the radiometric detection resolution of the device of the invention in the example of FIGS. 6A and 6B with the overlap areas highlighted.

FIG. 7 shows diagrammatically the radiometric detection resolution of the device of the invention in the example shown in FIGS. 6A and 6B, highlighting the overlap areas.

Thus the cross-hatched area in FIG. 7 shows the overlap area of the three antennas 1a, 1b, 1c from FIG. 6A, as seen in the plane 4 of the scene 5. This overlap area corresponds to the superposition of three elliptical areas.

Obtaining the correlation product of the signals picked up by the two antennas 2a, 2b (FIG. 6B) or by a combination of two antennas from the three antennas 2a, 2b, 2c (FIG. 6A) makes the overlap area discrete either by temporal scanning (digital architecture) or by mechanical scanning using mirrors (analog architecture).

In the example of a device using three systems of antennas 2a, 2b, 2c plus optical elements 3a, 3b, 3c, the overlap area is made discrete in three directions respectively parallel to the directions D between the antenna-and-optics systems (FIG. 6A). The digitization of the scene is then as described above with reference to FIGS. 4A and 4B except that overlap is total.

It should be remembered that the present description is given by way of example and is not limiting on the invention.

The invention claimed is:

1. A portable radiometric imaging device comprising:
at least first and second receiver antennas adapted to pickup electromagnetic radiation from first and second parts of a body or an article and to convert them into first and second signals representative of said radiation;
at least first and second receiver modules associated with said first and second antennas and adapted to receive said first and second signals representative of said radiation and to convert them into first and second electrical signals; and
a digital processor unit adapted to create, from said first and second electrical signals, at least one digital signal representative of said electromagnetic radiation to be displayed on a display as an image of said body or article;
wherein the first and the second receiver modules include a frequency reducer module, and wherein the device further comprises:
at least one deconvolution module adapted to deconvolute the first and second electrical signals at the output from the first and second receiver module;
a correlator module adapted to correlate said first and second deconvoluted electrical signals in order to form at least one signal representative of the electromagnetic radiation from the intersection of said first and second parts of said body or article.

2. A device according to claim 1, wherein the first and/or second receiver module includes a transition module preferably including a noise injector diode connected to a coupler, said coupler preferably being connected to a low-noise amplifier.

3. A device according to claim 1, wherein the frequency reducer modules include a millimeter-band mixer and a low-frequency low-noise amplifier.

4. A device according to claim 1, wherein the receiver modules and the digital processor unit are on the same semiconductor chip.

5. A device according to claim 1, wherein the device includes a module for converting the first and second electrical signals into first and second digital signals and wherein the correlator module is a module for digital correlation of said digital signals and is preferably incorporated in the processor unit.

6. A radiometric imaging method including:
a step of at least first and second receiver modules receiving and converting into first and second electrical signals first and second signals representative of radiation from first and second parts of a body or an article captured by first and second antennas; and
a step of a digital processor unit creating from said first and second electrical signals at least one digital signal representative of said electromagnetic radiation to be displayed on a display as an image of said body or article;
wherein the receiving and conversion step comprises a step of reducing the frequency of said electrical signals, and wherein said method further comprises a deconvolution step of deconvolutinq said first and second electrical signals and then a step of correlating said first and second deconvoluted electrical signals in order to form at least one signal representative of the electromagnetic radiation from the intersection of said first and second parts of said body or article.

7. A method according to claim 6, wherein the first and second electrical signals are converted into first and second digital signals by a converter module and wherein the correlation step is applied to said digital signals.

8. A method according to claim 7, wherein the correlation step includes:
at least one step of calculating from the first and second digital signals at least one digital correlation signal representative of the electromagnetic radiation from the intersection of the first and second parts of the body or article;
at least one step of creating by calculation at least one third digital signal representative of the electromagnetic radiation from an area neighboring the first and/or second parts; and
at least one step of calculating from the first and/or the second digital signal and from the third digital signal at least one digital correlation signal representative of the electromagnetic radiation from the intersection of the first and/or second parts of the body or article with said adjoining area.

9. A method according to claim 8, wherein the step of creating by calculation the third digital signal representative of the electromagnetic radiation from the area adjoining the first and/or second parts includes a step of time-shifting or phase-shifting the first and/or second digital signal.

10. A method according to claim 8, wherein it includes a step of calculating the difference between the digital correlation signal representative of the electromagnetic radiation from the intersection of the first and second parts of the body or article and the digital correlation signal representative of the electromagnetic radiation from the intersection of the first and/or second parts of the body or article with said adjoining area.

11. A method according to claim 6, wherein the correlation step is applied directly to the first and second electrical signals and it generates at least one electrical output signal that is converted into at least one digital signal by a converter module with a view to processing by the processor unit.

* * * * *